United States Patent Office 3,632,507
Patented Jan. 4, 1972

3,632,507
FLOCCULATION OF PARTICLES DISPERSED IN AQUEOUS MEDIA AND FLOCCULANTS USED THEREIN
Edward Witt, Dover, Del., assignor to Standard Brands Chemical Industries, Inc., Dover, Del.
No Drawing. Continuation-in-part of application Ser. No. 763,977, Sept. 30, 1968. This application June 30, 1970, Ser. No. 51,343
Int. Cl. C02b 1/20; C08d 3/06
U.S. Cl. 210—54
17 Claims

ABSTRACT OF THE DISCLOSURE

A process for treating a liquid dispersion of particles dispersed in an aqueous medium, e.g., waste waters, anionic polymeric latices and petroleum emulsions, to flocculate the particles, which comprises admixing the liquid dispersion with a cationic N-containing polymeric polyelectrolyte in sufficient amounts to flocculate the particles. The polymeric polyelectrolyte comprises a water soluble, polyquaternary ammonium salt containing quaternary nitrogen atoms within a polymeric backbone, e.g., the reaction product of N,N,N',N'-tetramethyl-2-hydroxy-1,3-propane diamine and beta, beta' dichlorodiethyl ether. The polymeric products obtained by this process exhibit improved physical properties, e.g., light, often white, color and greater Mooney Scorch stability as compared to polymers coagulated with other coagulants.

CROSS-REFERENCE TO RELATED APPLICATIONS

This application is a continuation-in-part of applicant's copending application, Ser. No. 763,977 entitled "Flocculation of Particles Dispersed in Aqueous Media," filed on Sept. 30, 1968, and now abandoned.

This invention relates to the precipitation or flocculation of particles dispersed in aqueous suspensions or colloidal systems, e.g., clarification of waste waters such as sewage and paper mill effluents, and to the coagulation of natural and synthetic latices and the like. More particularly, this invention relates to a process for effecting flocculation or coagulation of anionic polymeric aqueous latices by treatment with certain N-containing polyelectrolytes, to the improved coagulated polymers produced thereby, and to the flocculants used therein.

Heretofore, many types of flocculants have been used for precipitating dispersed materials from aqueous systems. In general, waste waters and rubber latices, natural and synthetic, are treated with different types of flocculants. Among the materials heretofore used as flocculants for waste water or coagulants for polymeric latices are organic materials such as polyethyleneimines and other nitrogen-containing polyelectrolytes, including some quaternary amines. Inorganic materials such as alkali metal and alkaline earth metal salts and the like are conventionally used to coagulate or destabilize polymeric latices. The use of these materials has, however, caused certain disadvantages. For instance, coagulation of butadiene copolymer latices often requires such large quantities of the organic coagulants that the properties of the resulting rubber products are adversely affected by, for example, poor Mooney Scorch, reduced stability after oven aging and less desirable color, i.e., dark or yellowish. Moreover, many carboxyl-containing diene latices often are cross-linked by some coagulants and thus the resultant elastomeric product fails to have the desired concentration of free carboxyl groups. Use of the inorganic coagulants, on the other hand, causes the resulting coagulated latex polymers to have a high ash content and to exhibit a corrosive effect on metal and the like materials. Advantageously, in accordance with this invention, many of the problems of the prior art are overcome by the use of unique N-containing polyelectrolyte cationic-type flocculants or coagulants.

Thus, this invention contemplates a process for treating a liquid dispersion of particles dispersed in an aqueous medium to flocculate the particles, which comprises admixing the liquid dispersion with a cationic N-containing polymeric polyelectrolyte in sufficient amounts to flocculate the particles, said polymeric polyelectrolyte comprising a water soluble, polyquaternary ammonium salt containing quaternary nitrogen atoms within a polymeric backbone. Also, this invention is concerned with certain unique flocculants which are especially preferred for the flocculation process of this invention.

In addition, this invention is directed to a process for coagulating polymeric latices to produce polymers having improved physical properties in which a dilute aqueous solution of the cationic polyelectrolyte is prepared and a polymeric latex in coagulating weight proportions is slowly added to the solution to precipitate its polymeric particles.

Advantageously, it has been found that the coagulated polymers, especially the diene rubbers, produced by this invention have a very light, often white, color and are more readily dyeable or colored by pigments and more commercially acceptable than the dark or yellow polymers produced by the use of many known coagulants. Also, it is of particular importance that the products of this invention are color stable, i.e., they maintain their light color for extended periods of time after oven aging or compounding and curing and do not discolor as many conventionally coagulated latex polymers. Furthermore, it has also been found that the N-containing polymeric polyquaternary ammonium salts used as coagulating agents in accordance with this invention do not cross-link with reactive radicals such as carboxyl, sulfo, amino, hydroxyl and the like, attached to the polymer chain of the polymer to be coagulated. For example, carboxyl radicals, such as those of polymers prepared from mono- and poly-carboxylic acids or partial esters of the polycarboxylic acids, have been found to be substantially gel-free when coagulated in accordance with this invention.

Accordingly, this invention is also concerned with the unique polymeric products obtained by coagulation with the N-containing cationic polyquaternary ammonium salts. These polymer products are characterized in that they exhibit improved Mooney Scorch stability after oven aging and have a light, often white, color before and after compounding and curing.

Another advantageous result of this invention, which is of particular importance, is that the polyquaternary salts used as coagulating agents show a greater efficiency for effecting flocculation or coagulation of particles dispersed in an aqueous medium. Consequently, considerably smaller amounts of these flocculants or coagulants may be used.

The polymeric polyquaternary ammonium salts used in this invention have a repeating unit of the following generalized formula:

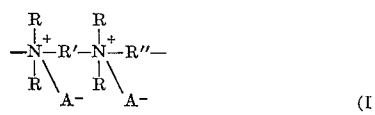
(I)

wherein R is a lower alkyl group, particularly an alkyl group containing 1–4 carbon atoms; R' is a lower alkylene group containing up to about 12 carbon atoms, such as an unsubstituted alkylene group or an alkylene group substituted with a hydroxyl or lower alkyl group, particularly a lower alkyl group containing 1–4 carbon atoms; preferably the alkylene group has from about 3 to about 6 carbon atoms; R" is a lower alkylene group, particularly an alkylene group containing 1–4 carbon atoms such as a methylene, ethylene, propylene, butylene, or a $(CH_2)_n-O-(CH_2)_n$ group with $n$ being an integer from 1 to 4; $A^-$ is an anion such as chloride, bromide or iodide.

These polyquaternary ammonium salts are the reaction products of a tetra-alkyl diamine having the general formula:

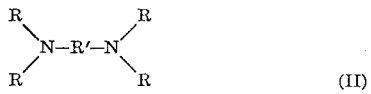
(II)

wherein R and R' are the organic groups defined in Formula I above, with approximately an equi-molar proportion of an organic dihalide having the general formula:

(III)

wherein A represents the anions and R" represents the organic radicals heretofore defined in Formula I.

The cationic polyquaternary ammonium salts useful as the flocculants or coagulating agents of this invention are produced by effecting reaction of from about 0.8 to 1.2 moles of the organic dihalide with one mole of the tetra-alkyl diamine in an aqueous medium at temperatures of from about 75° to about 120° C. for a period of 6 or more hours with continuous agitation. Preferably, the organic dihalide is used in excess of equi-molar proportions in order to increase the reaction rate.

The tetra-alkylated diamine designated by Formula II can be prepared by various reaction routes. One particularly effective route involves reacting an aqueous solution of a dialkylated secondary amine, such as dimethylamine, with a bifunctional compound, such as epichlorohydrin; 1,3-dichloro-2-propanol; 1,3 - dibromopropane; 1,3-dichloro-1-methyl-propane; 4-chloro-1,2-epoxy-butane; and the like. In general, at least three moles of the secondary amine are used per mole of the difunctional compound.

When a chloro-containing difunctional compound is used in the preparation, the amine hydrochloride produced is removed by treatment with a base, such as sodium hydroxide. Excess water and the secondary amine are removed by vacuum stripping.

From the resulting residue, a salt slurry, the ditertiary amine is extracted with ethanol or like polar-type solvents. The ethanol is removed by vacuum distillation. The pure ditertiary amine is then obtained by vacuum distillation.

Exemplary of the tetra-alkyl diamines that can be used to prepare the cationic polyquaternary ammonium salt flocculants or coagulants of this invention are N,N,N',N'-tetramethyl-2-hydroxyl-1,3-propane diamine; N,N,N',N'-tetramethyl-2-ethyl-1,3-propane diamine; N,N,N',N'-tetraethyl-3-hydroxy-1,4-butane diamine; N,N,N',N'-tetramethyl-1,3-butane diamine; and the like.

The organic dihalides which are reacted with the tetraalkyl diamines include beta,beta'-dichloro-diethylether; dibromomethane; dichloromethane; 1,2-dichloroethane; 1,2-dibromoethane; (ethylene dibromide); 1,3-dibromopropane; 1,4-dichlorobutane; 1,4-diiodobutane; and the like.

In preparing the polyquaternary ammonium salts, water is employed in amounts sufficient to insure solution of the reaction product and to adjust viscosity. In general, from about 50 parts to 100 parts by weight of water are used per 100 parts of the reactants. Upon completion of the reaction, the resulting polyquaternary ammonium salt may be used in solution as prepared or may be dried to form a highly hygroscopic, resinous, light yellowish-brown product.

In accordance with this invention, it has been found that particularly effective coagulating agents for anionic polymeric latices are obtained by reacting dichlorodiethyl ether and N,N,N',N'-tetramethyl-2-hydroxy-1,3-propane diamine in an approximate equi-molar proportion at temperature of 75° to 80° C. and in an aqueous medium for 6 hours.

In order to estimate molecular weights of the polyquaternary ammonium salts of this invention, intrinsic viscosities of selected samples were determined at 25° C. in 0.4 M KCl and 0.4 M KBr. This is done by preparing dilute solutions of the polymers in the medium and determining their specific viscosities ($\eta_{sp}$), where $\eta_{sp}$ equals $t/t'-1$ where $t$ is the time of flow for a solution of concentration C and $t'$ is the flow time for the pure solvent. A plot of $\eta_{sp}/C$ yields a straight line of which the intercept is intrinsic viscosity [$\eta$]. The intrinsic viscosity of one preferred polymer, i.e. the reaction product of N,N,N',N'-tetramethyl-2-hydroxy - 1,3 - propane diamine and dichloroethyl ether, in 0.4 M KCl varied between 0.06 and 0.22 (in 0.4 M KBr, the viscosity was 0.17). Based on the observation that the intrinsic viscosity was 0.22 gram per deciliter for an "ionene," i.e.

$$\left[-\underset{\underset{CH_3}{|}}{\overset{\overset{CH_3}{|}}{N^+}}-(CH_2)_6-\underset{\underset{CH_3}{|}}{\overset{\overset{CH_3}{|}}{N^+}}-(CH_2)_{10}-\right] \quad Br^- \quad Br^-$$

prepared from N,N,N',N'-tetramethyl-1,6-hexane diamine and 1,10-dibromodecane (as described in the Journal of Macromolecular Science-Chemistry, volume A3(1), page 95, January 1969) and which has a weight average molecular weight of 15,000±500 by light scattering measurements, it is believed that the polyquaternary ammonium salts are of the order of about 10,000 molecular weight, that is, there may be between about 10 and about 40 units in the polymer chain.

The water soluble cationic polyquaternary ammonium salts used by the processes of this invention, which are reaction products of a tetra-alkyl diamine and an organic dihalide as noted above, are further characterized by LVT Brookfield viscosities at 23° C. of from about 200 to 600 centipoises as obtained from the reaction and LVT Brookfield viscosities of 1,000 to 3,000 centipoises when in a 70% aqueous solution.

Moreover, aqueous solutions of these polyquaternary ammonium salts give a positive $AgNO_3$ test, thus indicating the presence of ionic halogen.

In effecting clarification of waste waters by flocculating suspended particles with cationic polyquaternary ammonium salts in accordance with this invention, it has been found that relatively small amounts of these ammonium salts are effective, and that the process of this invention is particularly efficient in terms of the amount of flocculant required. Depending on the degree of clarity desired, the amount of polyquaternary ammonium salt added may vary from about 2 p.p.m. to 20 p.p.m. Greater amounts may be used, but are usually unnecessary. In general, good flocculation, i.e., sufficient to remove substantially all suspended solid particles from the water without producing a water clear supernate, can be obtained by using 4 p.p.m. of the polyquaternary ammonium salts. At levels on the order of 8 to 15 p.p.m., excellent flocculation and crystal-clear supernate are normally obtained. It will be appreciated that the nature of the waste water governs, to a great extent, the amount of flocculant required. Thus, the presence of carbohydrates and other wastes from food-producing plants, the presence of industrial detergents and the like, will often affect the efficiency of the flocculants.

In accordance with this invention, it has been found that the improved coagulation (or flocculation) efficiency of the polyquaternary ammonium salts used by the processes of this invention is particularly evident in the treatment of polymeric anionic latices of the diene elastomeric type. The coagulation efficiency of these salts was determined by investigating a number of coagulants, including both organic and inorganic types. Comparison of the results of these investigations were made by defining a 100% efficient coagulant as one which requires 1.75 grams, on the dry basis, to coagulate 100 grams of polymer, on the dry basis, at a pH of 7. In effecting coagulation of the polymeric latices with organic coagulants, a solution of 1.75 grams of coagulant is dissolved in 3,500 cc. of water and the solution is adjusted by the addition of a base or acid if necessary, depending upon the pH of the polymeric latex. A latex which usually contains one or more antioxidants and having a pH adjusted is then added under agitation to the coagulant until crumbs (i.e., agglomerated particles), free from the aqueous dispersion of the latex, are obtained. This point in the coagulation procedure is called the isoelectric point of coagulation.

The polyquaternary ammonium salts of this invention have been found to exhibit a "coagulation efficiency" on the order of from about 120% to about 180%; whereas other cationic organic coagulants show an efficiency on the order of about 70% to about 95%.

Generally, in effecting coagulation of anionic polymer latices, the polyquaternary salts are used as dilute aqueous solutions in concentrations of from about 0.1 to 1.0% by weight. Based on 100 parts of polymer solids, on a dry basis, from about 0.5 to 1.5 parts by weight of the polyquaternary salts, on a dry basis, are used. Thereafter, water is separated from the coagulated polymer by conventional procedures, e.g., decanting, and the polymers are washed and dried.

It will be understood that the term "coagulation efficiency" as used herein is restricted to organic-type flocculants or coagulating agents. The inorganic coagulant salts, such as NaCl and CaCl$_2$ as heretofore noted, cause the coagulated polymer to have a high ash content and also to have a corrosive nature. Consequently, such polymers are unsuitable for many applications. Nevertheless, in determining the effects of the flocculants or coagulating agents of this invention, studies were made comparing polymers coagulated by both inorganic and organic coagulating agents in order to evaluate their effects on other physical properties of the polymers, such as Mooney viscosity, color, and oven age characteristics, as well as cured properties such as tensile strength, elongation, hardness and modulus of elasticity.

Advantageously, it has been found that the processes of this invention produce coagulated polymers having physical properties comparable or better than those produced by the use of conventional inorganic materials and having superior color and oven age stability compared to those produced by other organic coagulants.

Surprisingly, the color of the coagulated polymeric products produced by the process of this invention is considerably improved over that obtained by the use of other organic coagulants. In order to evaluate the color of the coagulated polymers, a test procedure was developed using the Gardner Color Scale. This test procedure, in essence, involves comparing the color of the raw coagulated polymeric product with a color chart having a numerical scale (the Gardner Scale), each number being indicative of the color of the material. This numerical scale varies from 0 to 7 and is indicative of the following colors:

| 0 | Water, clear. |
|---|---|
| 1 | White. |
| 2 | Slightly yellow. |
| 3 | Yellow. |
| 4 | Brownish yellow. |
| 5 | Brown. |
| 6 | Dark brown. |
| 7 | Dark, blackish color. |

Colors between these numerical values are usually approximated by the use of decimals, e.g., 1.5 indicates a color between white and slightly yellow.

As determined by this test procedure, the coagulated polymeric products of this invention exhibit Gardner Scale values of 1 to 2 when in the raw state (that is, directly after being coagulated), and exhibit Gardner Scale values of from 1.5 to 3 even after prolonged curing or after fluxing with other resinous materials, e.g., fluxing of a butadiene polymer coagulated by the process of the invention with a polyvinylchloride resin. It will be understood that the term "fluxing" refers to a procedure of milling a mixture of polymeric materials at temperatures of 300° to 340° F. on mill rolls until a homogeneous mixture is obtained.

Anionic polymeric latices suitable for the coagulation process of this invention can be prepared according to the processes known to the art. Preferably, the latices are prepared by emulsion polymerization of ethylenically unsaturated monomers in an aqueous medium.

The process of emulsion polymerization consists essentially in forming an emulsion of a monomer or a mixture of comonomers in an aqueous medium, and causing the monomer(s) to polymerize. About 2 to 10 parts of emulsifier per 100 parts of monomer are generally used. The ethylenically unsaturated monomers are emulsion polymerized using an anionic emulsifier, a catalyst, an antioxidant, a chelating agent, and a regulator or modifier to control the course of the polymerization and the molecular weight and degree of cross-linking of the final polymer in a manner heretofore known. The end product is a stable latex or dispersion of finely divided polymer particles in an aqueous medium.

Among the ethylenically unsaturated monomers that can be emulsion polymerized alone to form homopolymers, or in mixtures to form copolymers, are monoolefinic hydrocarbons, such as ethylene, propylene, n-butylene, isobutylene and the like, and diolefinic hydrocarbons such as the conjugated dienes, i.e., 1,3-butadiene; 2-methyl butadiene-1,3 (isoprene); 2,3-dimethyl butadiene-1,3; straight and branched chain piperylenes (pentadienes); straight and branched chain hexadienes; 2-neopentyl butadiene-1,3 and other hydrocarbon homologs of butadiene-1,3; substituted dienes, such as 2-chloro butadiene-1,3; 2-cyano butadiene-1,3; and the like. The conjugated dienes are used in major proportions to produce rubbery latices.

In general, dienes containing more than 10 carbon atoms often polymerize very slowly in the present polymerization systems; consequently, it is preferred to employ a diene having ten carbons or less. Dienes having from 4 to 6 carbon atoms have particularly advantageous reaction rates and polymerization characteristics, and therefore are usually preferred. The butadiene-1,3 hydrocarbons, and butadiene-1,3 in particular, are preferred.

Further, among the other monomers that can be employed are monoolefinic monomers containing an activated carbon to carbon double bond, that is, a monomer containing an olefinic double bond which readily functions in an addition polymerization reaction because of the olefinic double bond being present in the monomer molecule either in the alpha-beta position with respect to a strongly polar or functional group, such as nitrile, carboxylic ester, halogen, keto, amide, and other such groups well known in the art as activating groups, or because it is adjacent to a terminal methylene group, that is, $CH_2=$.

Among the other monoolefinic monomers copolymerizable with the dienes in aqueous dispersion and characterized by the presence of such groups are the aliphatic unsaturated nitriles, such as the lower molecular weight nitriles, e.g., acrylonitrile, alpha-chloro acrylonitrile, methacrylonitrile, ethacrylonitrile, propylene cyanide, butylene cyanide, and the like; styrenes such as styrene itself, halo, cyano, alkyl, aryl, and other substituted styrenes, e.g., vinyl toluene, alpha methyl styrene, alpha chloro styrene, p-phenyl styrene; other polymerizable vinyl compounds such as vinyl naphthalene, vinyl pyridine, and vinyl ethers and ketones; vinyl esters, particularly vinyl acetate, vinyl chloride, vinylidene chloride, and the like, and mixtures thereof; trifluoroethylene, trifluoro-chloroethylene, tetra-fluoroethylene, and the like; esters of monocarboxylic acids such as esters of acrylic and alpha-substituted acrylic acids, e.g., methyl acrylate, ethyl acrylate, methyl methacrylate, butyl methacrylate, isobutyl dichloro acrylate, and other acrylic esters of alcohols, preferably having from one to six carbon atoms in the alkyl group, amino-alkyl acrylates, e.g., amino-methyl acrylate, dimethyl-amino-ethyl acrylate, diethylaminoethylmethacrylate, monoethylaminoethylmethacrylate; and acrylamide, methacrylamide; vinyl, 2-vinyl pyridine, 4-vinyl pyridine, methyl vinyl pyridine, N-vinyl pyrroline, etc.

Also, the ethylenically unsaturated monomers include unsaturated carboxylic acids, their mono- and poly-esters, salts and anhydrides, such as maleic acid, fumaric acid, itaconic acid, aconitic acid, ethyl maleic acid, methyl itaconic acid, glutonic acid, beta-(p-carboxyl phenyl) acrylic acid, maleic anhydride, itaconic anhydride, mono- and di-esters of such acids, as mono- and di-alkyl maleates, as monomethyl maleate, monomethyl itaconate, dimethyl fumarate, etc., monosodium maleate, mono-sodium itaconate, etc.

In addition, the dimer and trimer of methacrylic acid and other monoolefinic polycarboxylic acids or their anhydrides which are readily hydrolyzed in the acid polymerization provide a means for direct introduction of the polycarboxylic acid groups into the carbon chain.

Among the other monomers that can be employed are the ethylenically unsaturated monocarboxylic acids such as acrylic acid, alpha-methacrylic acid, crotonic acid, alpha-chlorocrotonic acid, hydrosorbic acid, cinnamic acid, m-chlorocinnamic acid, p-chlorocinnamic acid, alpha-chloroacrylic acid, ethylacrylic acid, vinyl thiophenic acid, alpha-furyl acrylic acid, vinylfuroic acid, p-vinyl benzoic acid, vinylnaphthoic acid, alpha-isopropenyl acrylic acid, alpha-styryl acrylic acid, (2-carboxy-4-phenyl 1,3-butadiene), sorbic acid, alpha-methyl sorbic acid, alpha-ethyl sorbic acid, alpha-chloro-sorbic acid, alpha-bromo sorbic acid, beta-chloro sorbic acid, alpha-, beta-, or gamma-epsilon dimethyl sorbic acid, 2,4-heptadienoic acid, 2,4-hexadienoic acid, 2,4-pentadienoic acid, alpha-vinyl cinnamic acid, and alpha- and beta-vinyl acrylic acids.

Among the anionic surfactants that can be employed in the emulsion polymerization are the fatty acids, which contain from 8 to 20 carbon atoms, and their alkali metal soaps, e.g., enanthylic acid, caprylic acid, pelargonic acid, capric acid, undecylic acid, lauric acid, tridecoic acid, myristic acid, pentadecanoic acid, palmitic acid, margaric acid, stearic acid, nondecylic acid, arachidic acid and the like. Also included are amine soaps of these acids such as those formed from ammonia, mono- and di-alkyl amines, substituted hydrazines, guanidine, and various low molecular weight diamines; chain-substituted derivatives of the fatty acids, such as those having hydrocarbyl substituents, e.g., alkyl groups as methyl, ethyl, etc., hydroxyl, epoxy groups, ether groups, etc., attached to the straight chain; rosin and tall oil acids and their soaps; napthenic acids, and their soaps and the like.

Additional anionic emulsifiers that can be employed are sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols; sulfation products of lower polymers of ethylene as $C_{10}$ to $C_{20}$ straight chain olefins, and other hydrocarbon mixtures; sulfuric esters of aliphatic and aromatic alcohols having intermediate linkages, such as ether, ester, or amide groups such as alkylbenzyl (polyethyleneoxy) alcohols, the sodium salt of tridecyl ether sulfate.

Also among the anionic emulsifiers that can be employed are alkane sulfonates, esters, and salts such as alkylchlorosulfonates of the formula $RSO_2Cl$, wherein R is an alkyl radical having 1 to 20 carbon atoms, and alkylsulfonates of the formula $RSO_2OH$, where R has the above meaning; sulfonates with intermediate linkages such as ester- and ether-linked sulfonates, such as those having the formulae $RCOOC_2H_4SO_3H$ and $ROOC-CH_2-SO_3H$, wherein R has the above meaning, such as dialkyl sulfosuccinates, as di(2-ethylhexyl) sulfosuccinate, known as "Aerosol OT" and produced by American Cyanamid Co., ester salts of formula:

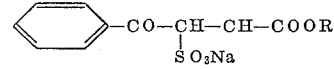

wherein R has the above meaning; amide-linked sulfonates such as Igepon T,

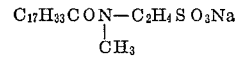

and other oleyl sodium taurides; alkarylsulfonates in which the alkyl groups contain preferably from 10 to 20 carbon atoms, as the dodecylbenzenesulfonates, such as sodium dodecylbenzenesulfonate, alkyl phenol sulfonates, such sulfonates wherein the benzene ring is additionally substituted by groups such as lower alkyl groups and halogen atoms; alkylarylsulfonates with intermediate linkages such as amide, hydrazine, ester and ether linkages; and mahogany and petroleum sulfonates.

Additionally, among the anionic emulsifiers that can be employed are phosphorus compounds such as oxy acids of phosphorus and their esters, as compounds of the formulae $R_1PO_4H_2$, $R_2PO_4H$, $R_3PO_4$, wherein R may be an alkyl group as di-(2-ethylhexyl) orthophosphate, $$C_{11}H_{23}CONHC_2H_4PO_4Na_2$$

$(C_{11}H_{23}CONHC_2H_4)_2PO_4Na$; sulfonic acids and their salts such as acids of the formula $RSO_2Na$, wherein R may be alkyl, and the like, sulfamic acid derivatives as the product made by reacting a N-hydroxy methyl fatty amide with sulfamic acid, sulfonamides, and sulfamido methylenesulfonic acids; sulfimides of the formula

wherein R may be alkyl and the like; rosin acids and their soaps, sulfonated derivatives of rosin and rosin oil; lignin sulfonates, and the like.

Usually, the polymerization reactions are promoted by the addition of free radical yielding initiators such as sodium or potassium persulfate, percarbonates, perborates and the like, organic peroxides such as benzoyl peroxide, acetyl peroxide, di-t-butyl peroxide, and the like; and the organic hydroperoxides such as di-isopropyl benzene hydroperoxide, and the like. Also, redox systems of polymerization initiation can be employed in which the above-mentioned initiators are utilized with suitable reducing agents well known in the art.

Small amounts of compounds often designated as "modifiers" which contain sulfhydryl groups can also be employed in the emulsion polymerization. Exemplary of the modifiers are the alkyl mercaptans containing 10 to 22 carbon atoms, such as n-dodecyl mercaptan, the commercially available mixtures of tertiary mercaptans containing 12 to 16 carbon atoms, such as t-dodecyl mercaptan and the like, thiophenol, and the like.

It will be understood that a wide range of temperatures may be used to effect polymerization of the monomeric mixtures; i.e., from about 40° F. to 170° F., and that such polymerization reactions result in the formation of polymers in the form of a latex, aqueous dispersion or suspension of small polymeric particles.

The emulsion polymerization mixture usually also includes a chelating or sequestering agent, such as ethylene diaminetetra-acetic acid, condensed phosphates, etc.

In addition to the treatment of waste waters and coagulation of polymeric latices, the polymeric polyquaternary ammonium salts of this invention may be utilized in a number of applications, such as the breaking of petroleum emulsions to separate the oil phase from the water phase, settling of mineral solids in the recovery and refining of ores, siliceous clays, etc., the flocculant of cellulose particles in the preparation of paper products and the like.

The following specific examples further illustrate the invention.

EXAMPLE I

This example illustrates preparation of one of the polyquaternary ammonium salts of this invention.

In a reaction vessel, 3.5 moles of dimethylamine (aqueous solution) were added to 1.0 mole of epichlorohydrin, with the temperature being maintained at 28° to 30° C. during the addition of the epichlorohydrin. Then the contents of the vessel were heated to 65° C. and held at this temperature for 4 hours.

After the reaction, 1.0 mole of sodium hydroxide was added to the reaction vessel. The reaction mixture was then vacuum stripped to remove water and excess dimethylamine. The residue, a salt slurry, was extracted with 1.35 moles of ethanol to remove the ditertiary amine product. The extract was flash distilled under vacuum to remove the ethanol, leaving a residue which was vacuum distilled at a pressure of 5 millimeters of mercury and at a temperature of 55° to 58° C. to provide the product N,N,N',N' - tetramethyl - 2 - hydroxy - 1,3 - propanediamine in a yield of 53.6%.

Upon analipis, the product showed a purity of 99%+.

To a reaction vessel were added 145 grams (0.993 mole) of the previously prepared N,N,N',N'-tetra-methyl-2 - hydroxy - 1,3 - propanediamine (hereinafter referred to a THPDA); 150 grams (1.048 moles) of beta,beta'-dichlorodiethylether (hereinafter referred to as DCEE); and 50 grams of water, with agitation. This mixture was heated to a temperature of 75° to 80° C. and held at this temperature for a period of 5½ hours. Then an additional 150 grams of water were added and the temperature of the reaction mixture maintained at 75° to 80° C. for an additional ½ hour. A polymeric polyquaternary ammonium salt product, containing repeating units of the following formula:

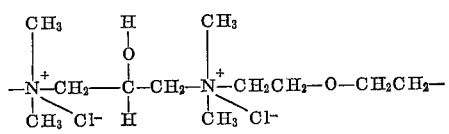

was obtained and found to have a LVT Brookfield viscosity of 318 centipoises measured at 23° C. on a viscometer using a spindle No. 2 and spindle speed of 30 r.p.m. and a solids content of 60.9%.

EXAMPLE II

Two additional salts were prepared by repeating the salt-forming reaction of Example I under the same conditions and by using the same amounts of water and of DCEE with 1.096 moles and 1.370 moles of THPDA, respectively. The resulting polyquaternary ammonium salts had Brookfield viscosities of 210 and 230 centipoises and solids contents of 68.0 and 65.0%, respectively; thus indicating that the viscosities (and molecular weights) are not greatly influenced by variations in the amount of reactants near equi-molar proportions.

EXAMPLE III

Another polymeric polyquaternary salt was prepared by following the procedure and conditions of Example I and by employing 0.993 mole of THPDA and 0.984 mole of ethylene dibromide (EDB). A polyquaternary polyammonium salt having a viscosity of 13.0 centipoises (No. 1 spindle at 60 r.p.m.), a solids content of 63.0%, and containing repeating units of the following formula:

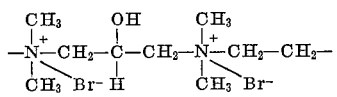

was obtained.

EXAMPLE IV

Following the procedure set forth in Example I another polymeric polyquaternary ammonium salt was produced by initially preparing N,N,N',N' - tetramethyl-1,3-butane diamine and reacting it with approximately equi-molar proportions of beta,beta' - dichlorodiethylether at a temperature of from 70 to 100° C. The resulting salt has a Brookfield viscosity of 390 centipoises and a solids content of 62.0%.

EXAMPLE V

Tests of the salts produced in Examples I–III (10% solutions) gave a positive silver nitrate test indicating the presence of ionic halogen.

EXAMPLE VI

This example illustrates the use of the polyquaternary ammonium salts according to the invention for flocculation and separation of sewerage. A polymeric quaternary ammonium salt obtained according to the procedures set forth in Example I, i.e. a reaction product of N,N,N',N' - tetramethyl - 2 - hydroxy - 1,3 - propanediamine and beta,beta' - dichlorodiethylether (Brookfield viscosity of 318 cps.) at 60.9% solids was used to treat raw sewerage in Dover, Delaware having a solids content of about 0.5%. When 11 parts of cationic polymer salt per million parts of sewerage were used excellent flocculation and a crystal clear supernatant was obtained. The addition of 4 parts per million of the polyquaternary salt produced good flocculation but the supernate was not clear. It was also determined that this sewerage contained higher than normal levels of carbohydrates which would act as a stabilizer, thus increasing the concentration required to effect good flocculation.

EXAMPLE VII

Preparation of the latices which can be coagulated by the process of this invention is illustrated by this example.

An aqueous solution consisting of 150 parts of water, 2.7 parts of an emulsifying agent (sodium salt of tridecyl ether sulfate), a chelating agent (.04 part of ethylenediaminetetraacetic acid), a redox type initiator (0.075 part of diisopropylbenzene hydroperoxide) and a modifier (0.5 part of tertiary dodecyl mercaptan) was placed in a reaction vessel. Then 25 parts of acrylonitrile followed by 10 parts of methacrylic acid were added to the reaction vessel. After the vessel had been purged to remove air, 65 parts of liquid butadiene-1,3 were poured into the reaction mixture. The reaction vessel was then brought to a temperature to 20°–22° C., the reaction mixture being agitated so as to form an emulsion. After about 23 hours, when the polymerization had reached approximately 80 percent conversion, the reaction was short-stopped by the addition of 0.3 part of 2,5-di-tert amyl hydroquinone, the agitation was stopped and the unreacted monomers and some water were removed by vacuum stripping.

This produced an emulsion having a total solids of about 35 percent expressed in weight of dry solids based on the total weight of the emulsion. To the latex then formed was added one part of a non-staining antioxidant (alkylated phenol) based on 100 parts of dry solids.

Using the above procedures, a series of butadiene-containing latices, each employing an anionic emulsifier, was prepared.

In each case, to 150 parts by weight water were added from 3–5 parts by weight anionic emulsifier, 0.4 part of sequestering agent, 0.5 part of mercaptan modifier and either a peroxygen or redox catalyst system. Secondary monomers such as styrene, acrylonitrile, and ethylenically unsaturated mono- or di-carboxylic acids were polymerized with butadiene.

The polymerization data for these latices (i.e. A through F) are summarized in Table 1 which follows.

Inorganic coagulants

A stabilized anionic latex sample containing 100 grams of dry polymer and having the pH adjusted is poured slowly under agitation into 1,000 cc. of water containing a predetermined amount of the inorganic salt in solution. In the following examples, 50 grams of NaCl and 2 grams of $CaCl_2$, respectively, were employed.

As heretofore noted, a 100% efficient organic coagulant is defined as that coagulant which requires 1.75 grams on the dry basis to coagulate 100 grams of polymer on the dry basis at a pH of 7.

The physical proportions of the coagulated polymer were defined for (1) "raw rubber"—the dry rubber obtained after coagulation with antioxidant (e.g. alkylated phenols or alkylated aryl phosphates) addition to the latex; (2) "a rubber compound"—a rubber with compounding chemicals added in a mill or Banbury during mastication; and (3) "a rubber–resinflux"—the rubber with a resin addition usually polyvinylchloride, a stabilizer and an antioxidant, the addition being made in a cold mill and fluxing conducted at 300° F. to 340° F. until homogeneity is obtained.

EXAMPLE VIII

This example illustrates the unique coagulation efficiency exhibited by the polyquaternary ammonium salts of this invention. Using the organic coagulation procedure heretofore described, samples of latices A, B, C and D were each coagulated by adding the latex to a solution containing polyquaternary ammonium salt produced in Example I (Polyquat No. 1), a polyethylenimine or a polyalkylenepolyamine. The coagulation efficiency ob-

TABLE 1.—POLYMERIZATION OF CARBOXYLATED BUTADIENE-CONTAINING LATICES

| Latex designation | A | B | C | D | E | F |
|---|---|---|---|---|---|---|
| Polymer composition: | | | | | | |
| Butadiene (percent wt.) | 71 | 63 | 71 | 68 | 65 | 68. |
| Acrylonitrile | | 37 | 27 | 32 | 25 | 25. |
| Styrene | 27 | | | | | |
| Acid | 2 | | 2 | | 10 | 7. |
| Emulsifier: | | | | | | |
| Composition | Sodium lauryl sulfate. | Sodium salt of tridecyl ether sulfate. | Sodium salt of tridecyl ether sulfate. | Sodium salt of tridecyl ether sulfate. | Sodium salt of tridecyl ether sulfate. | Sodium salt of tridecyl ether sulfate. |
| Type | Anionic | Anionic | Anionic | Anionic | Anionic | Anionic. |
| Reaction system: | | | | | | |
| Catalyst | Peroxygen | Redox | Redox | Redox | Redox | Redox. |
| Temperature (° C.) | 50 | 5 | 20–22 | 5 | 20–22 | 20–22. |

In the following examples, the coagulation efficiency of the cationic polymeric polyquaternary ammonium salts of this invention, when used to coagulate anionic polymeric latices, is evaluated and compared with those of two other cationic N-containing materials, i.e. a polyethylenimine (Montrex 600) and a polyalkylene-polyamine (Separan C–90) that is non-linear, branched and cross-linked and the reaction product of ethylene dichloride and triethylene tetramine, both of which are products of the Dow Chemical Company. Also, two inorganic coagulants, i.e. NaCl and $CaCl_2$, were used and evaluated.

The following coagulation procedures were employed:

Organic coagulants

A solution of 1.75 grams of coagulant is dissolved in 3,500 cc. of water and the pH adjusted from 7.0–7.5. A latex sample, containing an anionic emulsifier and antioxidant with its pH adjusted, is then added under agitation until polymeric crumbs free of dispersed latex and a substantially clear supernate is obtained. This point is designated as the isoelectric point of coagulation and serves as an end point at which coagulation is complete. The amount of latex added up to this point is used to determine the efficiency of the coagulant. Whether the cationic polymer is added to the latex or vice versa is immaterial from the standpoint of coagulating efficiency. However, better control of crumb size is obtained by the addition of latex to the coagulant-containing solution.

tained for each of the coagulants is given in the following table:

TABLE 2.—COAGULANT EFFICIENCIES OF ORGANIC COAGULANTS FOR DIFFERENT BUTADIENE LATICES

| | Latices | | | |
|---|---|---|---|---|
| Coagulants | A | B | C | D |
| Polyethylenimine | (¹) | 90–95 | (¹) | 90–95 |
| Polyalkylenepolyamine | (¹) | 90–95 | (¹) | 90–95 |
| Polyquat No. 1 | 150 | 125–135 | 150 | 125–160 |

¹ Coagulating efficiency not measurable because of formation of insoluble gel having a high Mooney viscosity and which is impracticably difficult to process during such operations as mixing, milling and extruding.

It will be noted from the above data that the polyquaternary ammonium salts of this invention consistently provide coagulation efficiencies substantially higher than those obtained by the other N-containing cationic materials, i.e., from about 120–160% in contrast to efficiencies of 90 to 95.

EXAMPLE IX

In this example, additional samples of latices A through F were coagulated by using the inorganic coagulants NaCl and $CaCl_2$, and by following the inorganic coagulant procedure previously described. The coagulated polymers obtained from this series of coagulations and those obtained in Example VIII were then tested for their physical properties, i.e. gel content, and degree of crosslinking, as well as Mooney viscosity and Gardner Color Scale Values before and after oven aging at 212° F. for 24 hours. The advantages obtained by the process of this invention are shown in the following table.

TABLE 3.—PHYSICAL CHARACTERISTICS OF BUTADIENE POLYMERS COAGULATED WITH VARIOUS COAGULANTS

| | Coagulants | | | | |
|---|---|---|---|---|---|
| | NaCl | CaCl | Polyethylene imine | Polyalkylene polyamine | Polyquat No. 1 |
| Bd/AN polymers (Latices B and D): | | | | | |
| Color, Gardner | 1 | 3 | 2.5 | 1. | |
| Gel content | None | None | None | None. | |
| Crosslinked | No | No | No | No. | |
| Raw Mooney viscosity | Stable | Stable | Stable | Stable. | |
| Oven aged at 212° F. for 24 hrs.: | | | | | |
| Color, Gardner | 7 | 5 | 5 | 2.5. | |
| Mooney viscosity | Poor | Fair | Fair | Good. | |
| Bd/AN/acid polymers (Latices E and F): | | | | | |
| Color, Gardner | 1 | 5 | 5 | 2. | |
| Gel content | None | None | None | None. | |
| Crosslinked | No | No | No | No. | |
| Raw Mooney viscosity | Stable | Stable | Stable | Stable. | |
| Oven aged at 212° F. for 24 hours: | | | | | |
| Color, Gardner | 6 | 7+ | 7+ | 6.5. | |
| Mooney viscosity | Fair | Poor | Poor | Fair. | |
| Bd/AN/acid and Bd/ST/acid polymers (Latices A and C): | | | | | |
| Color, Gardner | 2 | 5 | 5 | 1.5. | |
| Gel content | None | High | High | None. | |
| Crosslinked | No | Yes | Yes | No. | |
| Raw Mooney viscosity | Stable | Unstable | Unstable | Stable. | |

It will be observed that the physical characteristics of the polymers coagulated with various coagulants is dependent, to a great extent, upon the nature of the monomers used to prepare the polymers, and that in each class of polymers, the polyquarternary ammonium salts of this invention gave physical properties equal or better than those obtained by the use of other coagulants.

EXAMPLE X

An additional series of coagulations were made to demonstrate the effect of pH of the stabilized latex on the coagulant efficiency of the polyquaternary ammonium salts and the other organic coagulants.

TABLE 4.—EVALUATION OF COAGULANT EFFICIENCY (LATEX D)

| | Experiment Number | | | |
|---|---|---|---|---|
| | 1 | 2 | 3 | 4 |
| pH of latex | 3.5 | 7.2 | 10 | 6.8–7.0 |
| Coagulant | (1) | (1) | (1) | (2) |
| Coagulant efficiency, percent | 125 | 123 | 120 | 98 |

1 Polyquat No. 1.
2 Polyalkylene polyamine.

TABLE 5.—LATEX B

| | Experiment Number | | | | | |
|---|---|---|---|---|---|---|
| | 5 | 6 | 7 | 8 | 9 | 10 |
| pH of latex | 7.8 | 7.8 | 7.0 | 7.0 | 7.0 | 7.0 |
| Coagulant | (1) | (1) | (2) | (2) | (3) | (3) |
| Coagulant efficiency, percent | 140 | 158 | 88.5 | 107 | 78 | 94 |

1 Polyquat No. 1.
2 Polyalkylene polyamine.
3 Polyethylenimine.

TABLE 6.—EVALUATION OF COAGULATION EFFICIENCY (LATEX A)

| | Experiment Number | |
|---|---|---|
| | 11 | 12 |
| pH of latex | 2.5–3.0 | 2.5–3.0 |
| Coagulant | (1) | (1) |
| Coagulant efficiency, percent | 150 | 150 |

1 Polyquat No. 1.

From the above coagulation efficiency data, it will be observed that the pH of the latex often does not materially affect the efficiency and that the nature of the polymer charge, particularly the amount and type of emulsifier, is the primary factor determining the coagulation efficiency.

EXAMPLE XI

In order to further evaluate the effects on the physical properties of the polymeric products obtained by coagulation with the polyquaternary ammonium salts of this invention, a number of the coagulated polymers of the type produced in Example VIII were compounded, cured and then tested to evaluate their physical properties. The following compounding test recipes were employed for the three classes of copolymers employed.

TABLE 7.—COMPOUND RECIPE FOR EVALUATION OF VARIOUS POLYMERS

| | Recipe Number | | |
|---|---|---|---|
| | 1 | 2 | 3 |
| Monomers | Bd a AN | Bd b AN acid | Bd c AN acid |
| Parts: | | | |
| Polymer | 100.0 | 95.0 | 100.0 |
| Carbon black | 40.0 | 40.0 | 40.0 |
| Dibutyl phthalate | 5.0 | 5.0 | 5.0 |
| Spider sulphur | 1.5 | 1.0 | 1.5 |
| Stearic acid | 1.0 | 1.0 | 1.0 |
| Mercaptobenzothiazole | 1.0 | 1.0 | 1.0 |
| Zinc oxide | 3.0 | | 1.0 |
| Mixture of 55% ZnO₂ and 45% Zn(OH)₂ | | 10.0 | | a Latices B and D.
b Latices E and D.
c Latex C.

Evaluation of these compounded rubbers were made by using the ASTM test procedures conventionally used in the rubber industry.

TABLE 8.—PHYSICAL PROPERTIES EVALUATION OF COMPOUNDED Bd/AN POLYMERS (LATEX B)

Mixed alkylated aryl phosphates, antioxidant 1.5 phr.

| Coagulant | Polyquat No. 1 | Polyquat No. 1 | Polyquat No. 1 | Polyalkylene polyamine |
|---|---|---|---|---|
| Coagulation pH | 3.5 | 7.2 | 10.0 | 6.8 |

Mooney Scorch [1] at 250° F.

| | | | | |
|---|---|---|---|---|
| 5 point rise | 40 | 34 | 29 | 34 |
| 10 point rise | 44 | 37.5 | 31.5 | 38 |
| High value | 32 | 32 | 33 | 33 |
| Low value | 17 | 17 | 17 | 19 |

Unaged cure properties—Cure temperature 325° F.

| | | | | |
|---|---|---|---|---|
| Cure time (min.) | 17 | 21 | 25 | 21 |
| Tensile (p.s.i.) | 2,860 | 2,960 | 2,870 | 2,880 |
| Elongation (percent) | 820 | 800 | 720 | 820 |
| Hardness (Shore A) | 58 | 59 | 60 | 59 |
| 300% modulus (p.s.i.) | 620 | 675 | 820 | 680 |

Compression set B—Cure at 325° F.—Aged 22 hrs. at 212° F.

| | | | | |
|---|---|---|---|---|
| Cure time (min.) | 27 | 31 | 35 | 31 |
| Percent set | 54.9 | 53.7 | 53.3 | 58.2 |

Tear C [2]—Cured at 325° F.

| | | | | |
|---|---|---|---|---|
| Cure time (min.) | 17 | 21 | 25 | 21 |
| Average tear | 234 | 227 | 221 | 250 |

[1] ASTM D-1646-59T.
[2] ASTM D-624-54.

TABLE 9.—PHYSICAL PROPERTIES OF COMPOUNDED BD/AN/ACID POLYMERS (LATEX E)

| | Coagulant | | | | | | |
|---|---|---|---|---|---|---|---|
| | NaCl | NaCl | Polyalkylene polyamine | Polyethyleneimine | Polyquat No. 1 | Polyquat[1] No. 2 | |
| Stabilizer | (2) | (2) | (2) | (2) | (3) | (2) | (2) |

| Mooney Scorch at 250° F. | | | | | | | |
|---|---|---|---|---|---|---|---|
| 5 point rise | 20.5 | 22 | 19.5 | 19 | 17.5 | 16 | 15.5 |
| 10 point rise | 26.5 | 28 | 19 | 25 | 24 | 21 | 21 |
| High value | 30 | 42 | 42 | 53 | 47 | 39 | 42 |
| Low value | 20 | 29 | 25 | 28 | 34 | 24 | 22 |

| Unaged cure—Properties cure at 325° F. | | | | | | | |
|---|---|---|---|---|---|---|---|
| Cure time (min.) | 20 | 20 | 20 | 20 | 20 | 20 | 20 |
| Tensile (p.s.i.) | 3,240 | 3,190 | 3,270 | 3,280 | 3,450 | 3,200 | 3,250 |
| Elongation (percent) | 300 | 370 | 310 | 340 | 350 | 330 | 310 |
| Hardness (Shore A) | 79 | 76 | 79 | 77 | 78 | 77 | 80 |
| 300% modulus (p.s.i.) | 3,240 | 3,030 | 3,250 | 2,950 | 3,030 | 2,900 | 3,150 |

| Compression set B—Cure at 325° F.—Aged for 22 hrs. at 212° F. | | | | | | | |
|---|---|---|---|---|---|---|---|
| Cure time (min.) | 30 | | | | | | |
| Percent set | 30.9 | 30.6 | 30.3 | 31.9 | 30.5 | 31.6 | 25.8 |

| Oven aged properties—Cure at 325° F.—Aged for 70 hrs. at 212° F. | | | | | | | |
|---|---|---|---|---|---|---|---|
| Cure time (min.) | 20 | 20 | 20 | 20 | 20 | 20 | 20 |
| Tensile (p.s.i.) | 3,530 | 3,505 | 3,590 | 3,260 | 3,540 | 3,460 | 3,570 |
| Elongation (percent) | 190 | 190 | 200 | 180 | 200 | 200 | 200 |
| Hardness (Shore A) | 87 | 85 | 87 | 85 | 85 | 86 | 86 |
| 300% modulus (p.s.i.) | | | | | | | |

[1] The polyquaternary salt produced by Example IV.
[2] Alkylated phenol.
[3] Mixed alkylated aryl phosphates.

TABLE 10.— VALUATION OF PHYSICAL PROPERTIES OF COMPOUNDED BD/AN/ACID POLYMERS (LATEX C)

| | Coagulant | | |
|---|---|---|---|
| | NaCl | Polyquat No. 1 | Polyalkylene polyamine |
| Mill shrinkage (percent) | 21.2 | 14.4 | 21.2 |

| Mooney Scorch at 250° F. | | | |
|---|---|---|---|
| 5 point rise | 19.25 | 38 | 39 |
| 10 point rise | 27.5 | 48.75 | 48.5 |
| High value | 42 | 62 | 62 |
| Low value | 33 | 33 | 40 |

| Unaged cure properties—Cure at 307° F. | | | |
|---|---|---|---|
| Cure time (min.) | 17.5 | 30 | 30 |
| Tensile (p.s.i.) | 3,040 | 3,128 | 3,240 |
| Elongation (percent) | 790 | 780 | 740 |
| Hardness (Shore A) | 62 | 60 | 63 |
| 300% modulus (p.s.i.) | 800 | 720 | 1,010 |

| Oven aged at 212° F. for 70 hrs.—Cure at 307° F. | | | |
|---|---|---|---|
| Cure time (min.) | 17.5 | 30 | 30 |
| Tensile (p.s.i.) | 2,650 | 3,065 | 3,010 |
| Elongation (percent) | 450 | 530 | 410 |
| Hardness (Shore A) | 65 | 64 | 66 |
| 300% modulus (p.s.i.) | 1,610 | 1,450 | 2,100 |

| Compression set B—Cure at 307° F.—Aged at 212° F. for 22 hrs. | | | |
|---|---|---|---|
| Cure time (min.) | 27.5 | 40 | 40 |
| Percent set | 41.5 | 55.6 | 58.9 |

Inspection of the above data shows that the latices coagulated in accordance with this invention have properties usually equal to, and often superior to, those produced with the other coagulations while exhibiting substantially greater coagulation efficiency.

EXAMPLES XII

In this example, the polymer obtained by coagulation of latex B as described in Example VIII was fluxed with polyvinylchloride (PVC) to provide a composition with improved ozone resistance. Another sample of latex B coagulated with the polyalkylene polyamine coagulant was used as a control.

TABLE 11.—EVALUATION OF PVC/NITRILE RUBBER FLUXED AT 300°-310°F. ON MILL FOR FIVE MINUTES (LATEX B)

| | Coagulant | |
|---|---|---|
| | Polyquat No. 1 | Polyalkylene polyamine |
| Antioxidant | (1) | (1) |

| Compounding: parts by weight | | |
|---|---|---|
| Polymer | 70.0 | 70.0 |
| Cadmium stabilizer | .6 | .6 |
| PVC | 30.0 | 30.0 |
| Antioxidant | 1.4 | 1.4 |

| Mooney Scorch at 250° F. | | |
|---|---|---|
| 5 point rise | 41 | 27.25 |
| 10 point rise | 44 | 30.5 |
| High value | 31 | 45 |
| Low value | 15 | 24 |

| Ozone resistance—Bent loop—Cure 27.5 minutes at 325° F. | | |
|---|---|---|
| Cure time (hrs.) | 27.5 | 27.5 |

| Aged in ozone 70 hrs. at 100° F. in 50 phm. | | |
|---|---|---|
| Rating | Excellent | Excellent |

[1] Mixed alkylated aryl phosphates.

TABLE 12.—GARDNER COLOR SCALE VALUES OF PVC/NITRILE RUBBER HEATED ON MILL AT 300°-310° F., SAMPLES TAKEN AT 1 MINUTE INTERVALS

| | Coagulant used (Garner color scale) | |
|---|---|---|
| | Polyquat No. 1 | Polyalkylene polyamine |
| Time: | | |
| 0 | 1 | 2 |
| 1 | 1 | 2 |
| 2 | 1 | 3 |
| 3 | 1 | 3.5 |
| 4 | 1 | |
| 5 | 1 | |
| 6 | [1]1 | |
| 7 | [1]1.5 | |
| 8 | [1]1.5 | |
| 9 | [1]1.5 | |
| 10 | [1]1.5 | |

[1] Fluxed.

From the data in Table 12 it will be seen that the polyvinyl chloride-latex compositions obtained by the use of the coagulants of this invention exhibited Gardner Color Scale values of 1 during the time required for fluxing (i.e. 5 minutes), whereas the compositions coagulated with the polyalkylene polyamine gave values of 2 and 3.5. Even after fluxing, and an additional five minutes of continuous heating and blending on the mill, the Gardner Scale values are only 1.5. Moreover, the data in Table 11 show that not only were improved Gardner Color Scale values obtained but that the Mooney Scorch at 250° F. for the rubber of the invention was improved for most applications, while still maintaining the desired excellent ozone resistance.

EXAMPLE XIII

Another poly(quaternary ammonium) salt having repeating Polyquat units as illustrated in Example I was prepared in a commercial scale 500-gallon reactor. In this case, 49 parts by weight of THPDA; 51 parts by weight of DCEE and 16.25 parts by weight of water were charged to the reactor and stirred. This mixture was heated to a temperature of about 176° F. and maintained at this temperature for approximately 6 hours. Also a pressure of 5 p.s.i.g. was maintained with an inert gas mixture including nitrogen. The resulting product was steam stripped to remove unreacted DCEE. Then additional water (49.5 parts by weight) was added to adjust the viscosity. The final product had an LVT Brookfield viscosity of 520 centipoises measured at 23° C. on a viscometer using a No. 2 spindle and a spindle speed of 30 r.p.m. and a solids content of 55.6%. In the following example this polymer solution is designated as Polyquat 55.6. At 33.0% solids, Polyquat 55.6 had a Brookfield viscosity of 52 centipoises.

EXAMPLE IV

Intrinsic viscosities [η] were determined at 25° C. in 0.4 M KCl and 0.4 M KBr for Polyquat 55.6 prepared in Example XIII. Results were:

Table 6

| | |
|---|---|
| Source of sample Polyquat | 55.6 |
| [η]: | |
| 0.4 M KBr | 0.17 |
| 0.4 M KCl | 0.22 |
| Brookfield viscosity (cps.) | 52 |
| Percent solids | 33.0 |

A polymer similar to Polyquat 55.6 having the repeating unit structure heretofore noted, i.e.

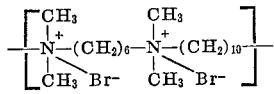

prepared from N,N,N′,N′-tetramethyl-1,6-hexane diamine and 1,10-dibromodecane was reported by Rembaum in Journal of Macromolecular Science-Chemistry, volume A3(1), at page 95 (January 1969) to have [η] at 25° C. in 0.4 M KBr of 0.22 and by light-scattering measurements to have a weight average molecular weight of 15,000±500. Since the [η] of Polyquat 55.6, which has a similar structure, is close to that reported by Rembaum, it is believed that the molecular weights of the Polyquat 55.6 are well above 10,000.

What is claimed is:

1. A process for treating a liquid dispersion of particles dispersed in an aqueous medium to flocculate the particles, which comprises mixing the liquid dispersion with a cationic N-containing polyelectrolyte in sufficient amounts to flocculate the particles, said polymeric polyelectrolyte comprising a water-soluble, polyquaternary ammonium salt containing quaternary nitrogen atoms within a polymeric backbone and having a repeating unit of the following generalized formula:

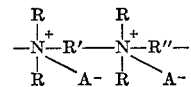

wherein R is an alkyl group containing from 1 to 4 carbon atoms; R′ is a lower alkylene group containing up to about 12 carbon atoms selected from the group consisting of unsubstituted alkylene groups and alkylene groups substituted with hydroxyl or alkyl groups containing from 1 to 4 carbon atoms; R″ is an organic radical selected from the group consisting of an alkylene group containing 1 to 4 carbon atoms and a $$(CH_2)_n—O—(CH_2)_n$$

group wherein n is an integer from 1 to 4 and A is an anion selected from a group consisting of chloride, bromide or iodide.

2. The process of claim 1 in which the polyquaternary ammonium salt is the reaction product obtained by reacting N,N,N′,N′-tetramethyl-2-hydroxy - 1,3 - propane diamine and beta,beta′ dichlorodiethyl ether in approximately equi-molar proportions at a temperature from about 75° to about 80° C. for a period of about six hours with continuous agitation in an aqueous medium.

3. The process of claim 1 in which the polyquaternary ammonium salt is a reaction product of a tetraalkyl diamine having the general formula:

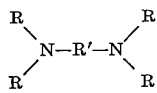

with from 0.8 to 1.2 moles of an organic dihalide having the general formula:

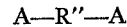

at a temperature of from about 75° to 125° C. for a period of at least 5 hours in an aqueous medium.

4. The process of claim 1 in which said polyquaternary ammonium salt has a Brookfield viscosity of from 200 to 600 centipoises at 60% by wt. polymer solids.

5. A process for coagulating polymeric latices to produce polymers having improved physical properties which comprises forming a dilute aqueous solution of a cationic, water-soluble, polyquaternary ammonium salt containing quaternary nitrogen atoms within a polymeric backbone and having a repeating unit of the following generalized formula:

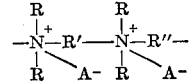

wherein R is an alkyl group containing from 1 to 4 carbon atoms; R is a lower alkylene group containing up to about 12 carbon atoms selected from the group consisting of unsubstituted alkylene groups and alkylene groups substituted with hydroxyl or alkyl groups containing 1 to 4 carbon atoms; R″ is selected from the group consisting of an alkylene group containing 1 to 4 carbon atoms and a $(CH_2)_n—O—(CH_2)_n$ group where n is an integer of from 1 to 4 and A is an anion selected from a group consisting of chloride, bromide or iodide; and thereafter adding a polymeric latex in coagulating weight proportions to precipitate its polymeric particles.

6. The process of claim 5 in which the polyquaternary ammonium salt is a reaction product of a tetraalkyl diamine having the general formula:

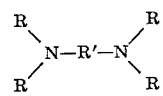

with from 0.8 to 1.2 moles of an organic dihalide having the general formula:

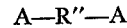

at a temperature of from about 75° to 125° C. for a period of at least 5 hours in an aqueous medium.

7. The process of claim 5 in which said polyquaternary ammonium salt has a Brookfield viscosity of from 200 to 600 centipoises at 60% by weight polymer solids.

8. The process of claim 5 in which the dilute aqueous solution has a concentration of polyquaternary ammonium salt of from 0.5 to 2.0 parts by weight whereby 100 parts of polymeric particles are coagulated at the isoelectric point of coagulation.

9. The process of claim 5 in which the polyquaternary ammonium salt exhibits a coagulation efficiency of from 120% to 180%.

10. The process of claim 5 in which the polyquaternary ammonium salt is the reaction product obtained by reacting N,N,N',N'-tetramethyl-2-hydroxy-1,3-propane diamine and beta,beta' dichlorodiethyl ether in approximately equimolar proportions at a temperature from about 75° to about 80° C. for a period of about six hours with continuous agitation in an aqueous medium.

11. A polymeric product produced by the process of claim 5, which comprises a coagulated latex polymer having a color with Gardner Color Scale value between 0 and 2 in the raw coagulated state and a Mooney viscosity of from 20 to 120.

12. The polymeric product of claim 11 in which the latex polymer is produced by emulsion polymerization of an aliphatic conjugated diene and at least one ethylenically unsaturated monomer copolymerizable with the diene.

13. A flocculant for treating a liquid dispersion of particles dispersed in an aqueous medium to flocculate the particles, which comprises a cationic N-containing polyelectrolyte that is a water-soluble, polyquaternary ammonium salt containing quaternary nitrogen atoms within a polymeric backbone and having a repeating unit of the following generalized formula:

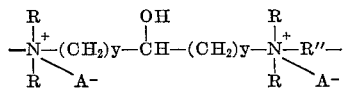

wherein R is an alkyl group containing from 1 to 4 carbon atoms; y is an integer from 0 to 5; R" is an organic radical selected from the group consisting of an alkylene group containing 1 to 4 carbon atoms and a

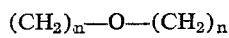

group wherein $n$ is an integer from 1 to 4 and A is an anion selected from a group consisting of chloride, bromide or iodide.

14. The flocculant of claim 13 in which the polyquaternary ammonium salt is the reaction product obtained by reacting N,N,N',N'-tetramethyl-2-hydroxy-1,3-propane diamine and beta,beta dichlorodiethyl ether in approximately equi-molar proportions at a temperature from about 75° to about 80° C. for a period of about six hours with continuous agitation in an aqueous medium.

15. The flocculant of claim 13 in which the polyquaternary ammonium salt is a reaction product of a tetraalkyl diamine having the general formula:

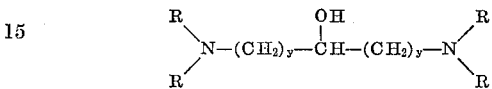

with from 0.8 to 1.2 moles of an organic dihalide having the general formula:

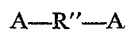

at a temperature of from about 75° to 125° C. for a period of at least 5 hours in an aqueous medium.

16. The flocculant of claim 13 in which said polyquaternary ammonium salt has a Brookfield viscosity of from about 200 to about 600 centipoises at 60% by weight polymer solids.

17. The flocculant of claim 13 in which said polyquaternary ammonium salt has an intrinsic viscosity in 0.4 M KCl between about 0.06 and 0.22.

References Cited
UNITED STATES PATENTS

| | | | |
|---|---|---|---|
| 2,261,002 | 10/1941 | Ritter | 260—2 X |
| 2,995,512 | 8/1961 | Weidner et al. | 210—54 |
| 3,219,578 | 11/1965 | Cruickshank et al. | 210—52 |
| 3,320,317 | 5/1967 | Rogers et al. | 210—54 X |
| 3,372,129 | 3/1968 | Phillips | 210—54 X |
| 3,409,547 | 11/1968 | Dajani | 210—54 |

MICHAEL ROGERS, Primary Examiner

U.S. Cl. X.R.

260—2, 815, 821